US012216938B2

(12) United States Patent
Jang

(10) Patent No.: US 12,216,938 B2
(45) Date of Patent: Feb. 4, 2025

(54) INTERWORKING METHOD EXTERNAL DEVICE AND STORAGE DEVICE

(71) Applicant: SK hynix Inc., Gyeonggi-do (KR)

(72) Inventor: In Jong Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 108 days.

(21) Appl. No.: 18/328,780

(22) Filed: Jun. 5, 2023

(65) Prior Publication Data

US 2024/0176542 A1    May 30, 2024

(30) Foreign Application Priority Data

Nov. 24, 2022 (KR) ........................ 10-2022-0159094

(51) Int. Cl.
    *G06F 3/06*      (2006.01)

(52) U.S. Cl.
    CPC .......... *G06F 3/0659* (2013.01); *G06F 3/0604* (2013.01); *G06F 3/0679* (2013.01)

(58) Field of Classification Search
    CPC .... G06F 3/0659; G06F 3/0604; G06F 3/0679; G06F 9/52; G06F 9/526; G06F 9/3851; G06F 9/485; G06F 9/4881
    See application file for complete search history.

(56) References Cited

U.S. PATENT DOCUMENTS

| | | | | |
|---|---|---|---|---|
| 8,352,623 | B2* | 1/2013 | Cherry | H04L 69/161 709/200 |
| 2012/0159487 | A1* | 6/2012 | Bates | G06F 9/526 718/100 |
| 2013/0305259 | A1* | 11/2013 | Wang | G06F 9/526 718/106 |
| 2022/0121451 | A1* | 4/2022 | Zhou | G06F 9/526 |

* cited by examiner

*Primary Examiner* — Francisco A Grullon
(74) *Attorney, Agent, or Firm* — IP & T GROUP LLP

(57) ABSTRACT

The present disclosure relates to a memory controller which supports an interworking method for a test between an external device and a storage device, and a host. The memory controller proposed in the present disclosure may include a first interface configured to communicate with an external device, a second interface configured to communicate with a memory, a command queue configured to store commands received from the external device and a processor configured to perform a control operation according to a command stored in the command queue, and suspend the performance of the control operation according to the command for a waiting time corresponding to a value of a mutex counter for the command, when a mutex flag for the command is activated.

15 Claims, 7 Drawing Sheets

INTERWORKING METHOD EXTERNAL DEVICE AND STORAGE DEVICE

CROSS-REFERENCE TO RELATED APPLICATIONS

The present application claims priority under 35 U.S.C. § 119 to Korean Patent Application No. 10-2022-0159094, filed Nov. 24, 2022, which is incorporated herein for all purposes by reference in its entirety.

BACKGROUND

Field

Various embodiments of the present disclosure relate to an interworking method between an external device and a storage device, and more particularly, to a memory controller and a host which support the interworking method.

Description of the Related Art

A storage device is capable of storing data according to a request of a host such as a computer, a mobile terminal (e.g., a smartphone or a tablet PC), and various electronic devices. The storage device may include a memory (i.e., memory device) and a memory controller for controlling the memory. The memory controller may receive a command from an external device (e.g., a host), may read data from the memory, may write/program data to the memory, and may perform or control operations for erasing the data of the memory on the basis of the received command.

When the external device provides a command, the storage device may operate on the basis of the provided command, and may transmit the results of the operation to the external device. When the storage device operates for a short time and transmits the results to the external device, it may be difficult for the external device to obtain enough time to perform an interworking test with the storage device. Further, since it is difficult to create malfunctions of the storage device for the purpose of the test, it may not be easy to perform a test on corresponding operations of the external device when the storage device malfunctions.

SUMMARY

Various embodiments of the present disclosure are directed to provide a test method which allows an external device to obtain enough time to perform an interworking test between the external device and a storage device and performs a test on corresponding operations of the external device, by implementing a response delay of the storage device, and provides a field to be included in a message for the test method.

The technical issue to be overcome by the present invention is not limited to the above-mentioned technical issues. Other technical issues not mentioned can be clearly understood from the embodiments of the present invention by a person having ordinary skill in the art.

An embodiment of the present disclosure is a memory controller including a first interface configured to communicate with an external device, a second interface configured to communicate with a memory, a command queue configured to store commands received from the external device and a processor configured to perform a control operation according to a command stored in the command queue, and suspend the performance of the control operation according to the command for a waiting time corresponding to a value of a mutex counter for the command, when a mutex flag for the command is activated.

The first interface may communicate with the external device by using a message, and a header of the message may include a mutex flag field and a mutex counter field.

The command queue may include a plurality of sub-command queues, and the plurality of sub-command queues may store the commands with different priorities.

The message is defined based on an UFS Protocol Information Unit (UPIU) of a universal flash storage (UFS) standard.

The mutex flag field and the mutex counter field are defined at a reserved field of the UPIU.

Another embodiment is a storage device including a memory device including a non-volatile memory configured to store data and a memory controller configured to control the memory device to write or read the data to or from the memory device, receive a command from an external device, suspend performance of a control operation according to the command for a waiting time corresponding to a value of a mutex counter of the command when a mutex flag is activated, and perform the control operation according to the command when the mutex flag is deactivated.

Further another embodiment is a system including: a host and a memory device including a non-volatile memory configured to store data, and a memory controller configured to control the memory device, to write or read the data to or from the memory device, receive a command from the host, suspend performance of a control operation according to the command for a waiting time corresponding to a value of a mutex counter of the command when a mutex flag is activated, and perform the control operation according to the command when the mutex flag is deactivated.

During a watchdog timer test, the host sets the mutex flag field for a command to be activated, and sets the mutex counter field of the command to have a value that allows the waiting time of the memory controller until transmitting response to the command to be greater than a watchdog time corresponding to a set value of the watchdog timer.

Yet another embodiment of the present disclosure is an operation method of a storage device. The operation method may include storing a command included in a message which is externally received, the message including a mutex flag field and a mutex counter field; determining whether a value of the mutex flag field is set to be activated; suspending execution of the command for a waiting time corresponding to a value of the mutex counter field, when the value of the mutex flag field is set to be deactivated; and executing the command after the waiting time elapses.

DETAILED DESCRIPTION

Hereinafter, various embodiments of the present disclosure will be described in detail with reference to the accompanying drawings. In the following description, it is to be noted that only a part necessary to understand an operation according to an embodiment of the present disclosure is described and descriptions of the other parts will be omitted in order not to obscure the subject matter of the present disclosure.

Figure 1:
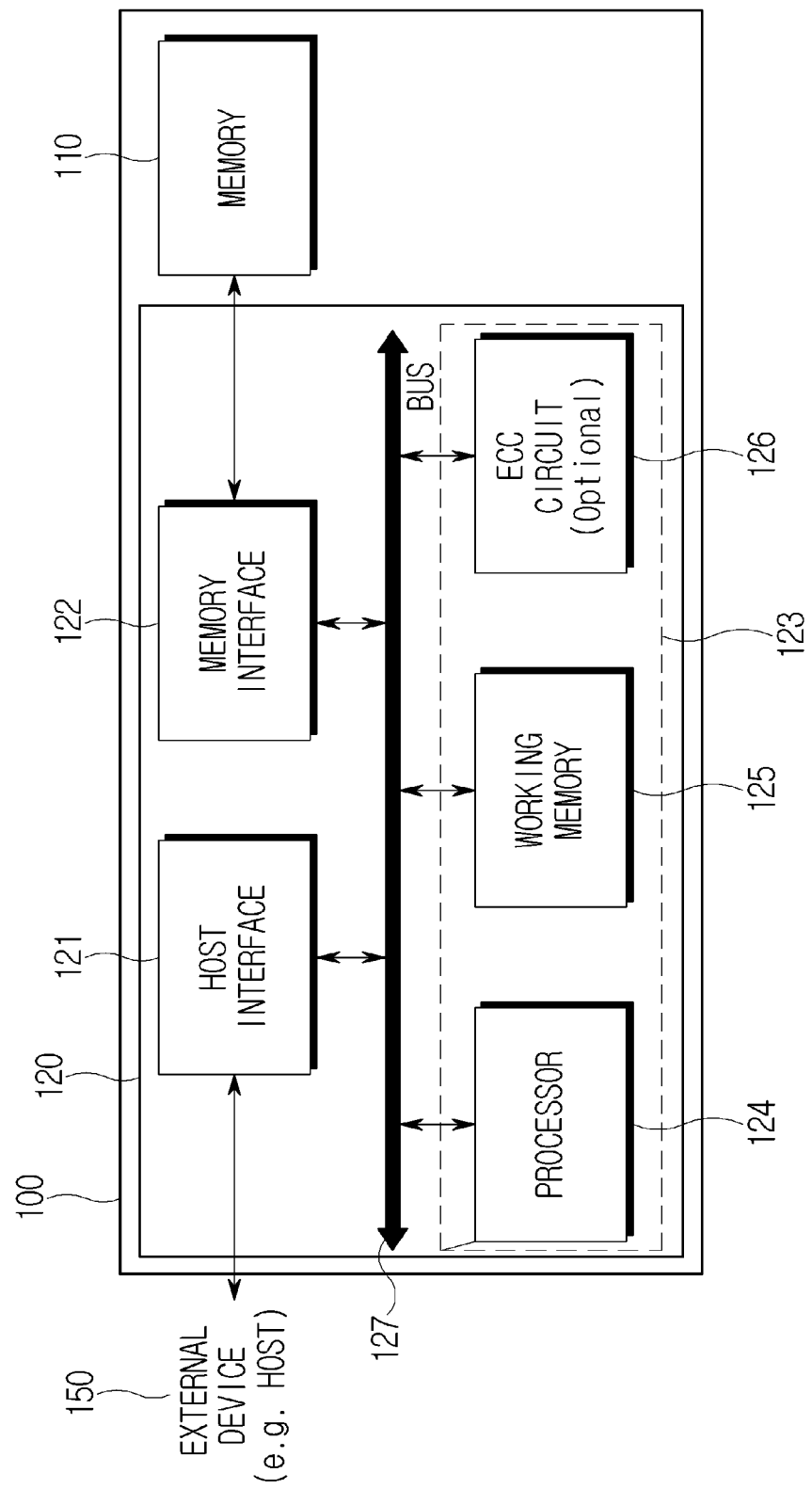
FIG. 1 is a block diagram showing schematically a configuration of a storage device according to an embodiment of the present disclosure.

FIG. 1 is a block diagram showing schematically a configuration of a storage device 100 according to an embodiment of the present disclosure.

Referring to FIG. 1, the storage device 100 may include a memory 110 for storing data, and a controller 120 for controlling the memory 110. Furthermore, additional components may also be included in the storage device 100.

The memory 110 may include a plurality of memory blocks, and may operate under the control of the controller 120. Here, the operation of the memory 110 may include, for example, a read operation, a program operation (also referred to as write operation), and an erase operation.

The memory 110 may include various types of non-volatile memory such as a NAND flash memory, a 3D NAND flash memory, a NOR flash memory, a resistive random-access memory (RRAM), a phase-change memory (PRAM), a magneto-resistive Random Access Memory (MRAM), a ferroelectric random-access memory (FRAM), a spin-transfer torque random-access memory (STT-RAM), and the like.

Further, the memory 110 may be implemented to have a three-dimensional array structure. Various embodiments of the present disclosure can be applied not only to a flash memory in which a charge storage layer is composed of a conductive floating gate, but also to a charge trap type flash (CTF) in which the charge storage layer is composed of an insulation layer.

The memory 110 may receive commands and addresses from the controller 120 (also referred to as a memory controller), and may access an area in a memory cell array selected by an address. That is, the memory 110 may perform an operation instructed by a command with respect to the area selected by the address.

For example, the memory 110 may perform a program operation, a read operation, and an erase operation. During the program operation, the memory 110 may program data in the area selected by the address. During the read operation, the memory 110 may read data from the area selected by the address. During the erase operation, the memory 110 may erase data stored in the area selected by the address.

The controller 120 may control the program (write), read, erase, and background operations performed on the memory 110. The background operation may include one or more of garbage collection (GC), wear leveling (WL), read reclaim (RR), and bad block management (BBM) operations.

The controller 120 may control the operation of the memory 110 in accordance with a request from an external device (e.g., a host) 150 located outside the storage device 100. Further, the controller 120 may control the operation of the memory 110 regardless of the request from the external device 150.

The external device 150 may include a computer, ultra-mobile PCs (UMPCs), a workstation, a personal digital assistant (PDAs), a tablet PC, a mobile phone, a smart phone, an e-book, a portable multimedia player (PMP), a portable game machine, a navigation system, a black box, a digital camera, a digital multimedia broadcasting (DMB) player, a smart television, a digital audio recorder, a digital audio player, a digital picture recorder, a digital picture player, a digital video recorder, a digital video player, a storage forming a data center, one of various electronic devices constituting a home network, one of various electronic devices constituting a computer network, one of various electronic devices constituting a telematics network, a radio frequency identification (RFID) device, or a mobile device (e.g., a vehicle, a robot, and a drone) that travels on the ground, on the water, or in the air under human control or autonomously.

The external device 150 may include at least one operating system (OS). The operating system can manage and control overall functions and operations of the external device 150, and can provide mutual operations between the external device 150 and the storage device 100. The operating system may be a general operating system or a mobile operating system, depending on the mobility of the external devices 150.

Further, the controller 120 and the external device 150 may be separated from each other. In some cases, the controller 120 and the external device 150 may be implemented as a single integrated device. Hereinafter, for convenience of description, an example will be described in which the controller 120 and the external device 150 are separated from each other.

The controller 120 may include a host interface 121, a memory interface 122, a control circuit 123, and the like.

The host interface 121 may provide an interface for communicating with the external device 150. For example, the host interface 121 may provide an interface that uses at least one of various communication standards or interfaces such as a universal serial bus (USB), a multimedia card (MMC), a peripheral component interconnection (PCI), a PCI-express (PCI-E), an advanced technology attachment (ATA), a Serial-ATA, a Parallel-ATA, a small computer small interface (SCSI), an enhanced small disk interface (ESDI), an integrated drive electronics (IDE), a universal flash storage (UFS), a system management bus (SMBus), an inter-integrated circuit (I2C), an improved inter-integrated circuit (I3C), a proprietary protocol, and the like.

The control circuit 123 may receive a command through the host interface 121, and may perform an operation of processing the received command.

The memory interface 122 may be connected to the memory 110 to provide an interface for communicating with the memory 110. That is, the memory interface 122 may provide an interface between the memory 110 and the controller 120 under the control of the control circuit 123.

The control circuit 123 may control the operation of the memory 110. To this end, in an embodiment, the control circuit 123 may include a processor 124, a working memory 125, and an error detection and correction circuit (i.e., ECC circuit) 126.

The processor 124 may control overall operations of the controller 120.

The processor 124 may communicate with the external device 150 through the host interface 121, and may communicate with the memory 110 through the memory interface 122.

The processor 124 may perform a function of a flash translation layer (FTL). The processor 124 may convert a logical block address provided by the external device 150 into a physical block address through the flash translation layer. By using a mapping table, the flash translation layer may receive the logical block address, and may convert the logical block address into a physical block address.

There are various address mapping methods of the flash translation layer depending on a mapping unit. For example, the address mapping methods include a page mapping method, a block mapping method, a hybrid mapping method, and the like.

The processor 124 may randomize data received from the external device 150, for example, by using a set randomizing seed. The randomized data may be provided to the memory 110, and may be programmed into the memory 110.

The processor 124 may de-randomize the data received from the memory 110 during the read operation, for example, by using a de-randomizing seed. The de-randomized data may be output to the external device 150.

The processor 124 may control the memory 110 to perform background operations such as a garbage collection (GC) function, a wear leveling (WL) function, a bad block management function, and the like.

In order to secure a free space in which no data has been written when there is not enough space to write data, in the memory 110, the garbage collection operation may collect data partially written in an existing memory block, and may move the data to another memory block.

Further, in order to prevent errors and data loss of the memory 110 in advance and to improve the durability and stability of a product, the wear leveling operation may be performed to prevent the excessive use of a specific block by evenly writing data to all memory blocks of the memory 110.

The bad block management operation may detect a bad block within the memory 110, and may replace the bad block with a spare block which is available, so that data is prevented from being written to the bad block.

The processor 124 may control the operation of the controller 120 by executing firmware. For example, the processor 124 may execute (i.e., drive) firmware stored in the working memory 125 during a booting process. Hereinafter, the operation of the storage device 100 described in various embodiments of the present disclosure is implemented in such a manner that the processor 124 executes firmware in which corresponding operations are defined.

The firmware is a program (or software) which is executed in the storage device 100 in order to drive the storage device 100, and may include various functional layers. For example, the firmware may include binary data in which codes for executing each of the aforementioned functional layers are defined.

For example, the firmware may include the flash translation layer (FTL), a host interface layer (HIL), and a flash interface layer (FIL). The flash translation layer may perform a translation function between the logical block address transmitted from the external device 150 to the storage device 100 and the physical block address of the memory 110. The host interface layer may interpret the command received from the external device 150 through the host interface 121, and transmit the interpreted command to the flash translation layer. The flash interface layer may transmit the command instructed by the flash translation layer to the memory 110.

Further, the firmware may include the garbage collection function, the wear leveling function, and the bad block management function.

Such firmware may be, for example, loaded into the working memory 125 from the memory 110 or a separate non-volatile memory (e.g., ROM, NOR Flash, and the like) located outside the memory 110. When executing a booting process after power-on, the processor 124 may first load all or part of the firmware into the working memory 125.

The processor 124 may perform a logic operation defined in the firmware loaded into the working memory 125 in order to control operations of the controller 120. The processor 124 may store a result obtained by performing the logic operation defined in the firmware in the working memory 125. The processor 124 may generate a command or signal in accordance with the result obtained by performing the logic operation defined in the firmware. When part of the firmware in which the logic operation to be performed is defined is not loaded into the working memory 125, the processor 124 may generate an event (e.g., interrupt) for loading the corresponding part of the firmware into the working memory 125.

The processor 124 may load, from the memory 110, meta data required to drive the firmware. The meta data is used for managing the memory 110, and may include management information on user data stored in the memory 110.

Moreover, the firmware may be updated while the storage device 100 is being produced or while the storage device 100 is running. The controller 120 may download new firmware from the outside of the storage device 100, and may update the existing firmware to the new firmware.

The working memory 125 may store firmware, program codes, commands, and data required to drive the controller 120. The working memory 125 may include at least one of volatile memories such as a static RAM (SRAM), a dynamic RAM (DRAM), a synchronous DRAM (SDRAM), and the like.

The error detection and correction circuit 126 may detect an error bit of a target data by using an error correction code, and may correct the detected error bit. The target data may be, for example, data stored in the working memory 125 or data read from the memory 110.

The error detection and correction circuit 126 may decode data with the error correction code, and may be implemented with a variety of decoders. For example, a decoder that performs non-systematic decoding or a decoder that performs systematic decoding may be used.

For example, the error detection and correction circuit 126 may detect an error bit in units of sectors set for each read data. That is, each read data may be composed of a plurality of sectors. The sector may refer to a data unit smaller than a page which is a read unit of a flash memory. The sectors constituting each read data may correspond to each other through the medium of an address.

The error detection and correction circuit 126 may calculate a bit error rate (BER), and may determine whether correction is possible in units of a sectors. For example, the error detection and correction circuit 126 may determine that a corresponding sector is uncorrectable or fail when the bit error rate is higher than a preset reference value. On the other hand, if the bit error rate is lower than the reference value, the error detection and correction circuit 126 may determine that the corresponding sector is correctable or pass.

The error detection and correction circuit 126 may sequentially perform an error detection operation and an error correction operation on all the read data. When the sector included in the read data is correctable, the error detection and correction circuit 126 may omit the error detection operation and the error correction operation on the corresponding sector in the next read data. When the error detection and correction operations on all read data are completed in this way, the error detection and correction circuit 126 may detect sectors that are determined to be uncorrectable until the end of the data. There may be one or more sectors determined to be uncorrectable. The error detection and correction circuit 126 may transmit information (e.g., address information) on the sector determined to be uncorrectable to the processor 124.

A bus 127 may provide a channel between the components 121, 122, 124, 125, and 126 of the controller 120. The bus 127 may include, for example, a control bus for transmitting various control signals, commands, and the like, and a data bus for transmitting various data.

Moreover, some of the aforementioned components 121, 122, 124, 125, and 126 of the controller 120 may be removed, or some of the aforementioned components 121, 122, 124, 125, and 126 of the controller 120 may be integrated into one. In some cases, in addition to the above-described components of the controller 120, one or more other components may be added.

Figure 2:
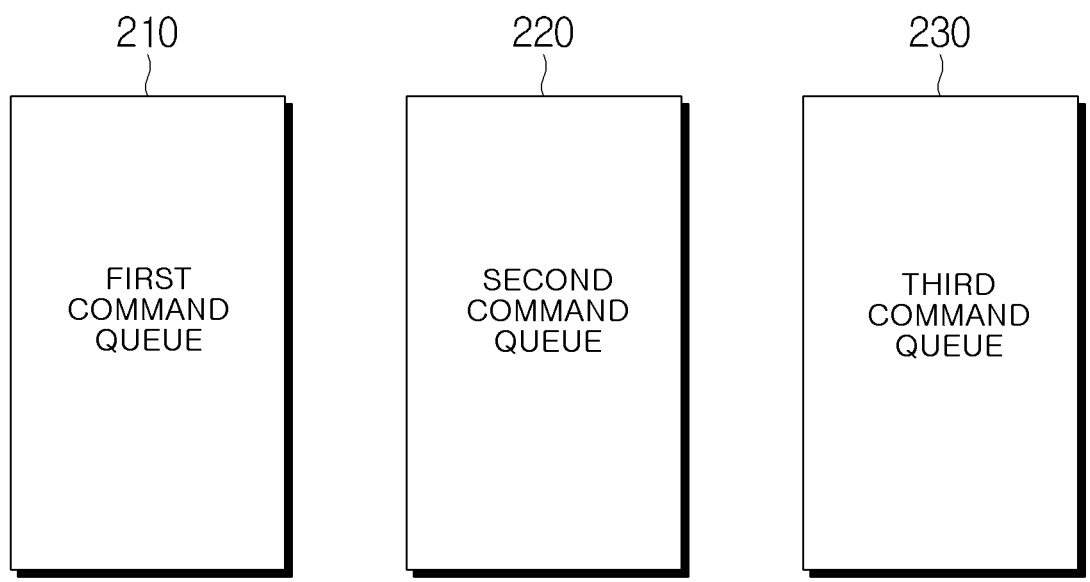
FIG. 2 is a block diagram showing a command queue according to an embodiments of the present disclosure.

FIG. 2 shows a command queue according to an embodiment of the present disclosure.

Referring to FIG. 2, the storage device 100 may include a command queue. The command queue may include a plurality of command queues (i.e., sub-command queues) 210, 220, and 230 such that commands having the same type or the same priority can be stored in separate command queues. In an embodiment, a command with the highest priority (e.g., a read command) may be stored in the first command queue 210, and a command with the second priority (e.g., a program command) may be stored in the second command queue 220, and a command with the lowest priority (e.g., an erase command) may be stored in the third command queue 230. Although FIG. 2 shows that the storage device 100 includes three command queues as an example, the number of command queues included in the storage device 100 may be randomly determined.

In an embodiment, the command queue may be a storage space capable of sequentially storing commands received from the external device 150. A portion of the working memory 125 or a memory within the processor 124 may be used as the command queue.

In an embodiment, each command queue may operate in a first in first out (FIFO) manner. That is, a command first input to the command queue is output first, and the corresponding command can be executed.

The processor 124 may receive a command from the external device 150 through the host interface 121, may determine a priority of the received command, and may store the command in a command queue corresponding to the determined priority.

The processor 124 may also read stored commands, starting from the command queue 210 with the highest priority in order to execute commands from the external device 150, and may execute the commands corresponding thereto.

In an embodiment, the processor 124 may determine whether there exists a command stored in the first command queue 210. If a command exists, the processor 124 may read the command from the first command queue 210, and may perform an operation corresponding thereto.

If the first command queue 210 is empty, the processor 124 may determine whether there exists a command stored in the second command queue 220. If a command exists, the processor 124 may read the command from the second command queue 220, and may perform an operation corresponding thereto.

If the second command queue 220 is empty, the processor 124 may determine whether there exists a command stored in the third command queue 230. If a command exists, the processor 124 may read the command from the third command queue 230, and may perform an operation corresponding thereto.

The external device 150 may verify an operation in a suspended status. In general, the external device 150 transmits a command to be verified, and additionally transmits a command with a higher priority than that of the command, and thus, has caused forcibly a suspended status. However, there may be issues that the command with a higher priority has to be continuously transmitted and it is difficult to determine the timing because it is not possible to find out when the command to be verified is executed. Therefore, it may not be easy to verify.

In order to resolve these issues, the present disclosure proposes that the command (i.e., command massage) includes additionally a mutex (i.e., mutual exclusion object) flag field and a mutex counter field.

Figure 3:
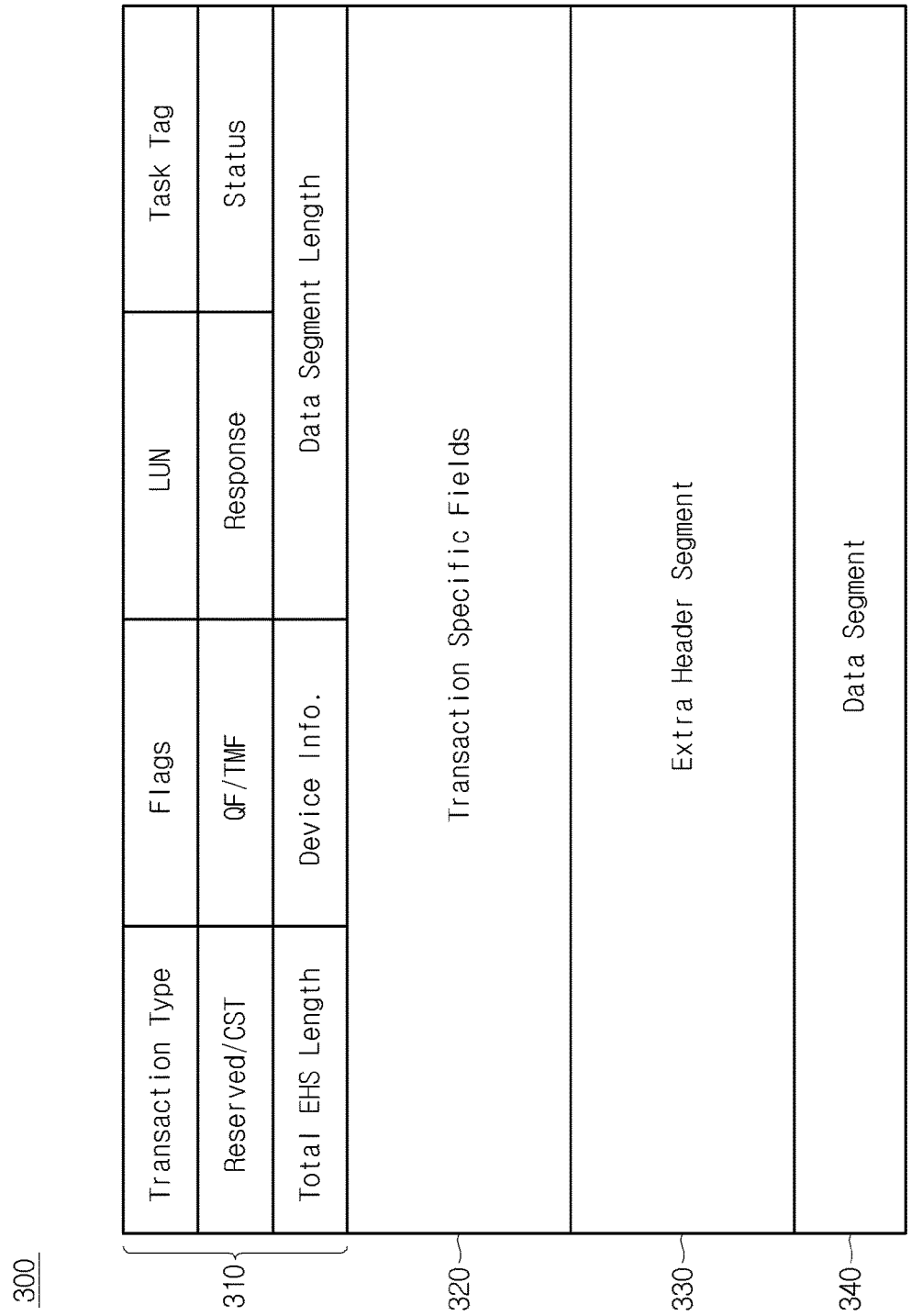
FIG. 3 is a block diagram showing an example of a message that is transmitted from an external device to the storage device according to an embodiment of the present disclosure.

FIG. 3 is a block diagram showing an example of a message 300 that is transmitted from the external device 150 to the storage device 100 according to an embodiment of the present disclosure.

Although FIG. 3 shows a universal flash storage (UFS) standard and a UFS Protocol Information Unit (UPIU), the type of the message which is transmitted from the external device 150 to the storage device 100 is not necessarily limited thereto. The message (or command message) may have various and different types according to an interface method between the external device 150 and the storage device 100.

Referring to FIG. 3, the message 300 transmitted from the external device 150 to the storage device 100 may include a basic header 310, transaction specific fields 320, an extra header segment 330, and data segment 340.

The basic header 310 includes fields of a transaction type, flags, a logical unit number (LUN), a task tag, a command set type (CST), a query function/task managing function (QF/TMF), a response, a status, a total extra header segment (EHS) length, device information, and a data segment length. Further, the basic header 310 may include reserved field. Here, the transaction type indicates a format of a message to be transmitted. According to the UFS standard, the defined transaction type may include "NOP OUT," "NOP IN," "COMMAND," "RESPONSE," "DATA OUT," "DATA IN," "TASK MANAGEMENT REQUEST," "TASK MANAGEMENT RESPONSE," "READY TO TRANSFER," "QUERY REQUEST," "QUERY RESPONSE," "REJECT UPIU," and the like. Depending on the transaction type, the transaction specific field 320, the extra header segment 330, and the data segment 340 may or may not be used, types of each of them may be different from each other. Since the structure of the message transmitted according to each transaction type is already known by referring to the UFS standard, a detailed description of the detailed structure of each message is omitted in the present disclosure.

The present disclosure proposes to include new fields, such as the mutex flag field and the mutex counter field, in a command (i.e., a command message), and the mutex flag field and mutex counter field may be newly set in the reserve field included in the basic header 310. Since the reserve field has no use purpose in the current UFS standard, even if a new function is assigned to the reserve field, the existing operations may not be affected, so that the function proposed in the present disclosure can be performed while maintaining backward compatibility. In an embodiment, the mutex flag field and the mutex counter field may be included in the transaction specific field 320 or the extra header segment 330.

Figure 4:
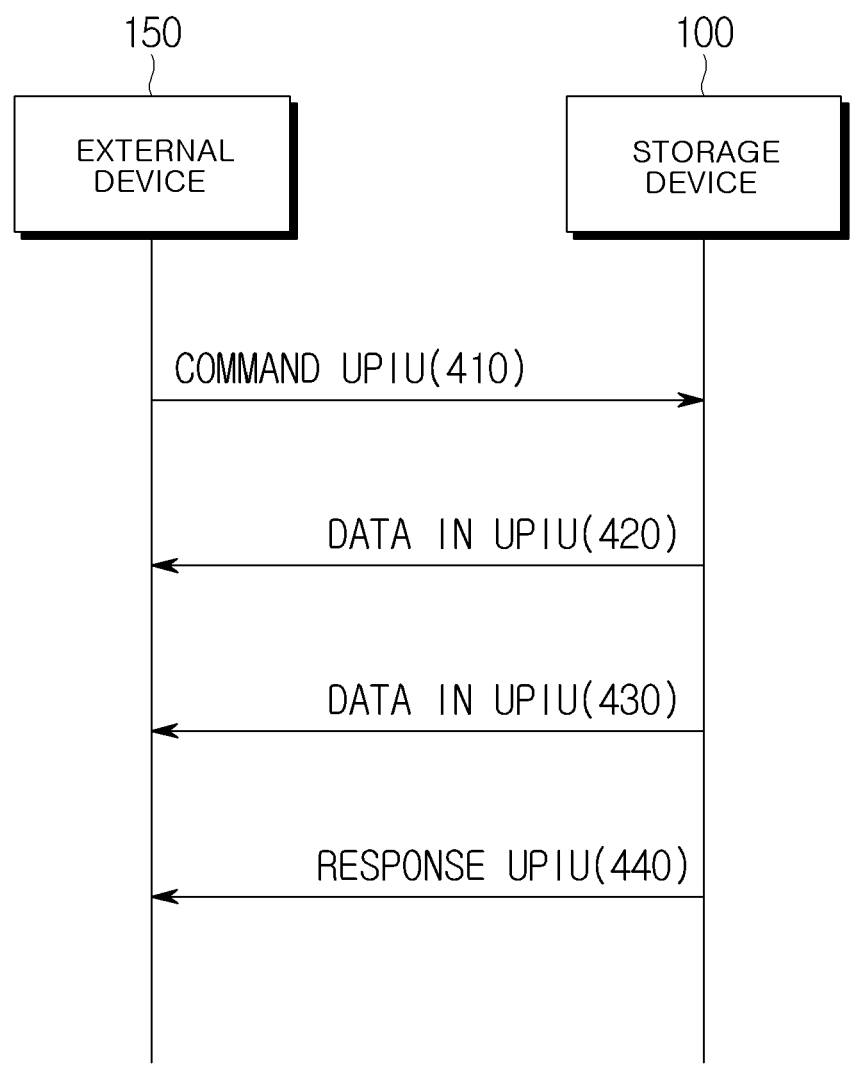
FIG. 4 is a sequence diagram showing read transactions based on a UFS transport layer according to an embodiment of the present disclosure.

FIG. 4 is a sequence diagram showing read transactions based on a UFS transport layer according to an embodiment of the present disclosure.

Referring to FIG. 4, the external device 150 may perform the read transactions in order to read data stored in the storage device 100. The external device 150 may transmit COMMAND UPIU to the storage device 100 (transaction 410) so that the read transactions may be initiated. The COMMAND UPIU may mean that the transaction type is set to "COMMAND" in the message 300 of FIG. 3. Further, the COMMAND UPIU may include, in the transaction specific field 320, a flag representing that the command is a read command, address information to be read, and the like.

When receiving the COMMAND UPIU, the storage device 100 may store the COMMAND UPIU in one of the plurality of command queues of FIG. 2. In addition, the storage device 100 may execute commands according to priority, may read data from the memory device 110 based on the address information included in the COMMAND UPIU, and may transmit the data to the external device 150 by using DATA IN UPIUs (transactions 420 and 430). Although the example of FIG. 4 shows that two DATA IN UPIUs are transmitted (i.e., transactions 420 and 430), more DATA IN UPIUs than that or only one DATA IN UPIU may be used depending on a size of data to be transmitted. Further, after transmitting all read data, the storage device 100 may complete the read transactions while transmitting RESPONSE UPIU (transaction 440). The DATA IN UPIU may mean that the transaction type is set to "DATA IN" in the message 300 of FIG. 3. The RESPONSE UPIU may mean that the transaction type is set to "RESPONSE" in the message 300 of FIG. 3.

Figure 5:
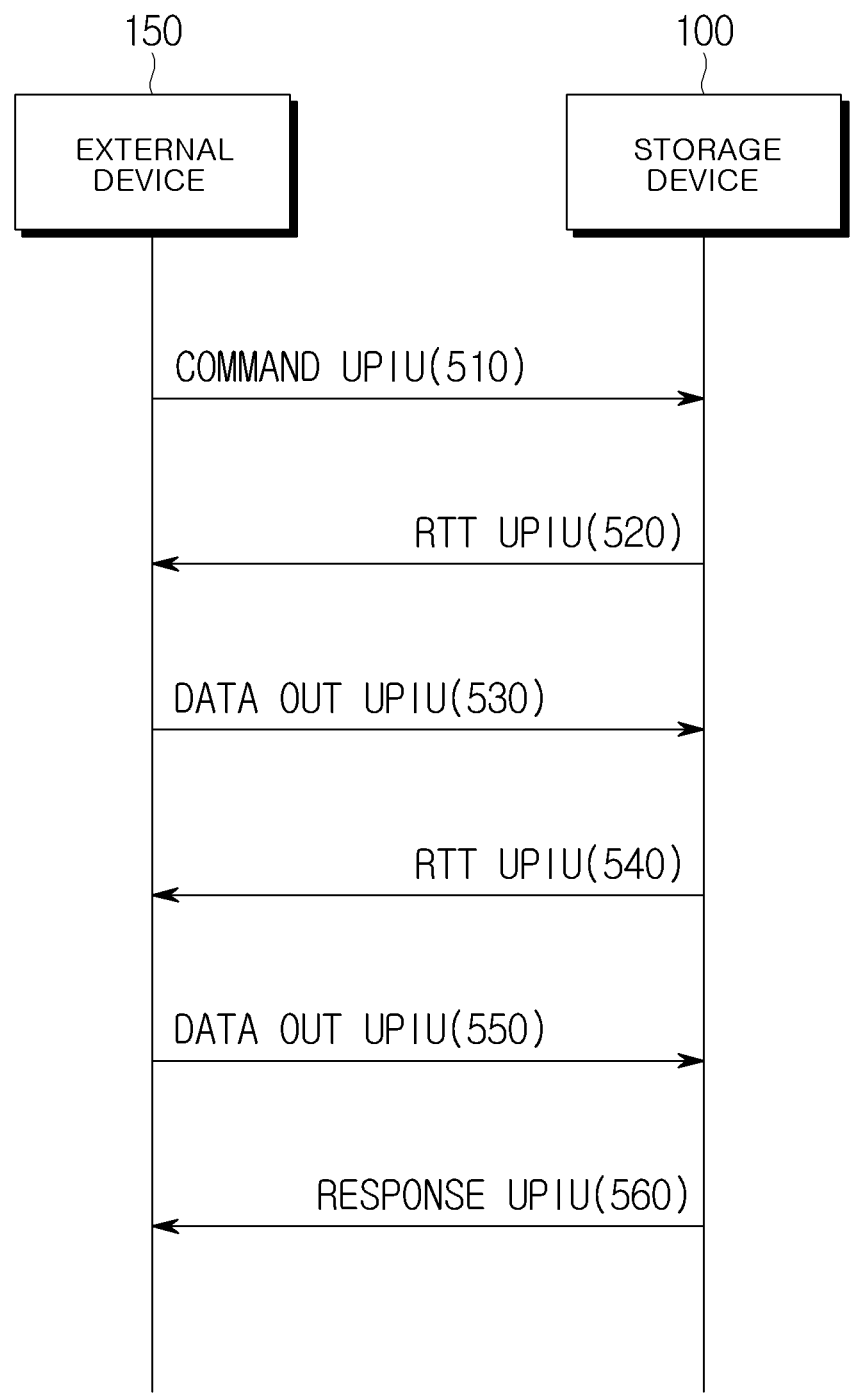
FIG. 5 is a sequence diagram showing program transactions based on the UFS transport layer according to an embodiment of the present disclosure.

FIG. 5 is a sequence diagram showing program transactions based on the UFS transport layer according to an embodiment of the present disclosure.

Referring to FIG. 5, the external device 150 may perform the program transactions in order to write data to the storage device 100. The external device 150 may transmit COMMAND UPIU to the storage device 100 (transaction 510) so that the program transactions may be initiated. The COMMAND UPIU may mean that the transaction type is set to "COMMAND" in the message 300 of FIG. 3. Further, the COMMAND UPIU may include, in the transaction specific field 320, a flag representing that the command is a program command, address information to be read, and the like.

When receiving the COMMAND UPIU, the storage device 100 may store the COMMAND UPIU in one of the plurality of command queues of FIG. 2. In addition, when the storage device 100 executes commands according to priority and is ready to receive data from the external device 150, the storage device 100 may transmit READY TO TRANSFER (RTT) UPIU to the external device 150 (transaction 520). The external device 150 which has received the RTT UPIU may transmit the data to be programmed to the storage device 100 by using DATA OUT UPIU (transaction 530). The storage device 100 which has received the DATA OUT UPIU 530 may store data to be programmed included in the DATA OUT UPIU 530 in a temporary memory (e.g., the working memory 125), and may transmit additional RTT UPIU to the external device 150 (transaction 540) when not receiving all data to be programmed. The external device 150 which has received the RTT UPIU 540 may transmit additional data to be programmed to the storage device 100 by using DATA OUT UPIU (transaction 550). The storage device 100 which has received the DATA OUT UPIU may store data to be programmed included in the DATA OUT UPIU in a temporary memory (e.g., the working memory 125), and may complete the program transactions while transmitting RESPONSE UPIU (transaction 560) when receiving all data to be programmed. Although the example of FIG. 5 shows that two DATA OUT UPIUs are transmitted (i.e., transactions 530 and 550), more than two DATA OUT UPIUs or only one DATA OUT UPIU may be used depending on a size of data to be programmed.

It may be required to verify the operation of the external device 150 in malfunctions in the transaction status shown in FIGS. 4 and 5. For example, when verifying the operation of the external device 150 in a case where the external device 150 transmits the COMMAND UPIUs to the storage device 100 (transaction 410 or 510) and then does not receive the DATA IN UPIU (see transaction 420) or the RTT UPIU (see transaction 520) which corresponds thereto, it may not be easy to generate an error corresponding thereto. As an example, if the external device 150 transmits the COMMAND UPIUs (transaction 410 or 510) and then does not receive a UPIU corresponding thereto within a first time period, the external device 150 may determine that an error has occurred and may perform a corresponding operation for overcoming the error. To verify such a corresponding operation, the external device 150 needs to perform many complex UPIU transmissions. For example, the external device 150 may first transmit the COMMAND UPIU with a low priority (e.g., a COMMAND UPIU for programming) a plurality of number of times, thereby causing a memory area to be erased (ERASE), and may transmit the COMMAND UPIU with a priority just above the low priority (e.g., a read COMMAND UPIU) a plurality of number of times, thereby causing the erasure to be suspended (SUSPEND).

In order to prevent such complexity of the verification and to make it easier to verify the operation of the external device 150, the mutex flag field and the mutex counter field may be included in the header of the message 300 shown in FIG. 3, which is for transmitting the command from the external device 150 to the storage device 100.

The mutex flag field and the mutex counter field may be included anywhere in the header of the message 300 under the condition that a normal operation of the storage device 100 is maintained as it is. In an embodiment, the mutex flag field and the mutex counter field may be included in the basic header 310 or the extra header segment 330. In an embodiment, the mutex flag field and the mutex counter field may use the reserve field of the basic header 310 or the extra header segment 330.

Figure 6:
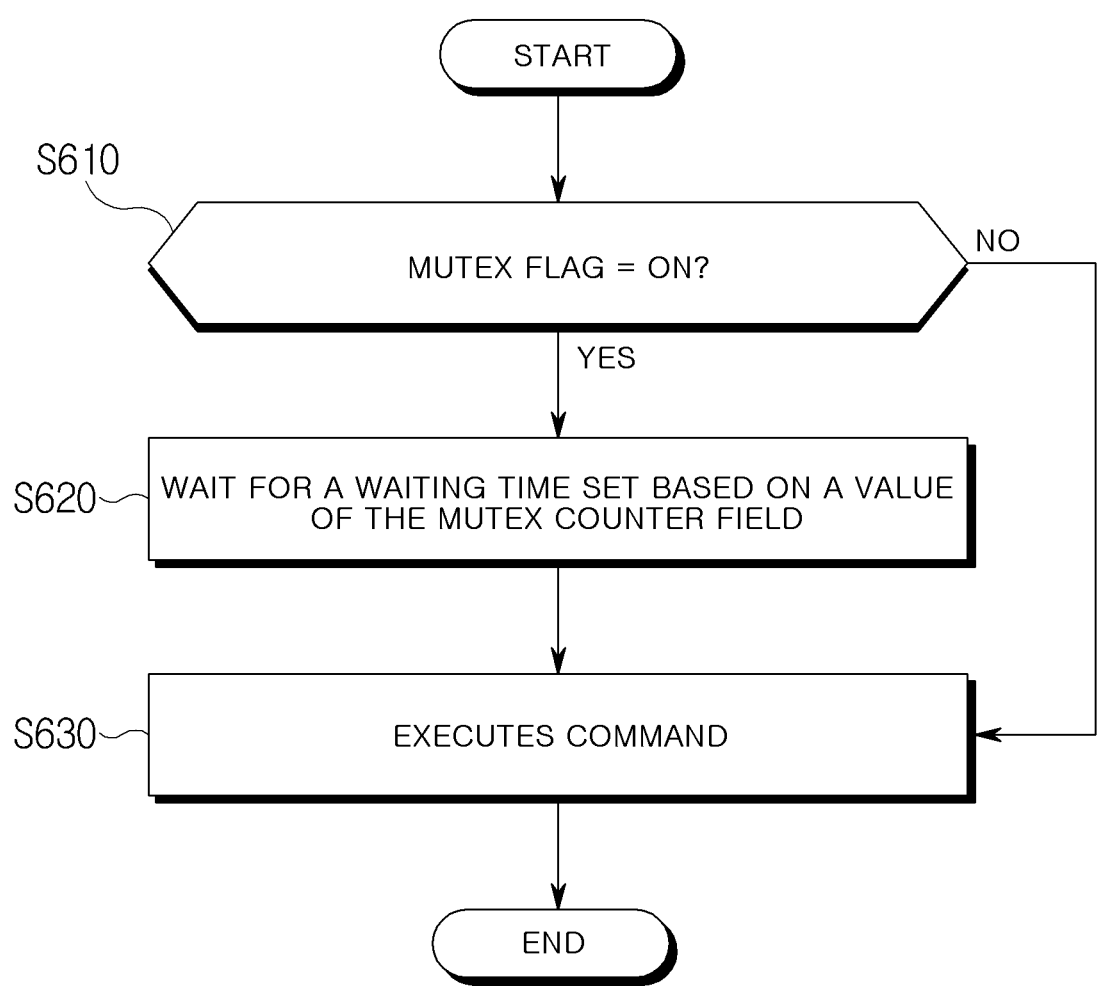
FIG. 6 is a flowchart for describing an operation of the storage device receiving a command including a mutex flag field and a mutex counter field according to an embodiment of the present disclosure.

FIG. 6 is a flowchart for describing an operation of the storage device 100 which has received a message including the mutex flag field and the mutex counter field.

In an embodiment, operations illustrated in the flowchart of FIG. 6 may be performed by the processor 124 of FIG. 1.

The storage device 100 may determine whether to temporarily suspend the execution of the command or to immediately perform the execution of the command for each of the commands stored in the plurality of command queues 210, 220, and 230 shown in FIG. 2 in accordance with the flowchart of FIG. 6.

Referring to FIG. 6, in operation S610, the storage device 100 may determine whether the mutex flag field included in the command is 'ON' (i.e., the mutex flag is activated). If the mutex flag field is not 'ON' (i.e., the mutex flag is deactivated, NO in the operation S610), the storage device 100 may immediately execute the command (operation S630). If the mutex flag field is 'ON' (i.e., the mutex flag is activated, YES in the operation S610), the storage device 100 may wait for a waiting time set based on a value of the mutex counter field (operation S620) and then may execute the command (the operation S630).

Figure 7:
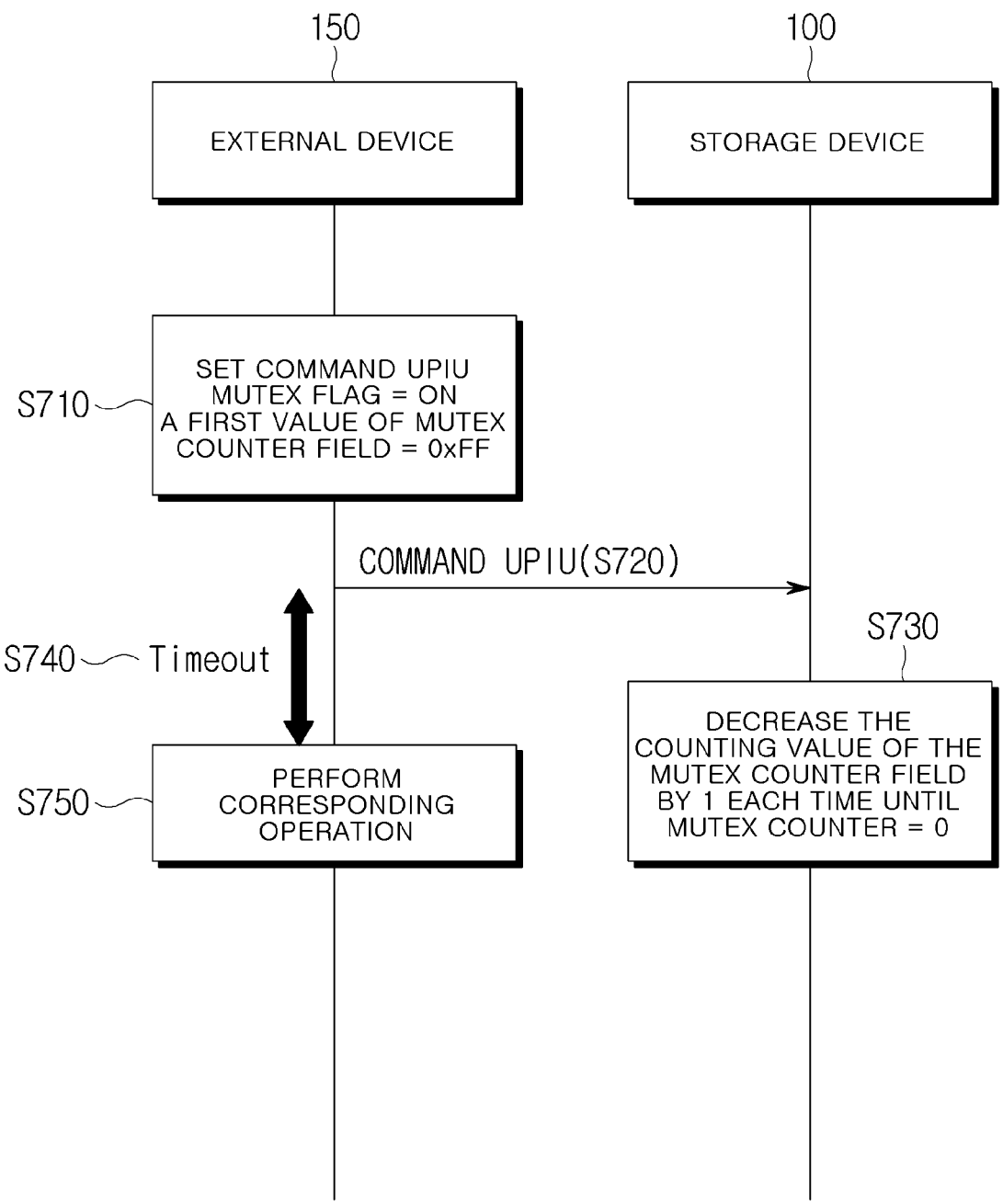
FIG. 7 is a sequence diagram for describing an external device test method based on a message including the mutex flag field and the mutex counter field according to an embodiment of the present disclosure.

FIG. 7 is a sequence diagram for describing an external device test (i.e., an interworking test) method based on a message including the mutex flag field and the mutex counter field.

Referring to FIG. 7, in operation S710, in order to test a response operation to a response delay of the storage device 100, the external device 150 may set the mutex flag field in the header of the message (e.g., COMMAND UPIU) to 'ON', and may set the mutex counter field to have a first value (e.g., 0xFF). In this case, a time corresponding to the first value should be longer than a waiting time (i.e., watchdog time) for the external device 150 to receive a corresponding response from the storage device 100.

In operation S720, the external device 150 may transmit the COMMAND UPIU to the storage device 100, and may set watchdog timer to have a value corresponding to a predetermined waiting time for waiting a response from the storage device 100. The external device 150 may then decrease the watchdog timer by '1' for each predetermined time period (a clock time).

The storage device 100 may store the COMMAND UPIU received from the external device 150 in the command queue. Then, in operation S730, if the mutex flag field of the header of the corresponding command is 'ON' the storage device 100 may wait without transmitting a corresponding response message until a waiting time set based on a value of the mutex counter field is passed.

If watchdog is occurred or watchdog timer in the external device 150 becomes '0' (operation S740) while the storage device 100 is waiting without transmitting the corresponding response message, the external device 150 may perform a corresponding operation (operation S750) which is performed when a response for the transmitted command is not received.

As described above, according to the present disclosure, the header of the message transmitted from the external device to the storage device includes the mutex flag field and the mutex counter field. By using the mutex flag field and the mutex counter field, a response of the storage device is delayed, and thus, errors can be easily authorized. Due to this, the external device can test the normal operation, etc., of a watchdog timer.

According to various embodiments of the present disclosure, when verifying an interworking operation between the external device and the storage device or verifying the operation of the storage device, sufficient timing to perform a test can be provided, so that it is possible to easily perform verification operations and to easily verify error injection.

Further, according to various embodiments of the present disclosure, the storage device can remain verified, which makes it possible for the external device easier to verify.

Various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

It should be noted that although the technical spirit of this disclosure has been described in connection with embodiments thereof, this is merely for description purposes and should not be interpreted as limiting. It should be appreciated by one of ordinary skill in the art that various changes may be made thereto without departing from the technical spirit of the disclosure and the following claims.

What is claimed is:

1. A memory controller comprising:
   a first interface configured to communicate with an external device;
   a second interface configured to communicate with a memory;
   a command queue configured to store commands received from the external device; and
   a processor configured to perform a control operation according to a command stored in the command queue, and suspend the performance of the control operation according to the command for a waiting time corresponding to a value of a mutex counter for the command, when a mutex flag for the command is activated.

2. The memory controller of claim 1,
   wherein the first interface communicates with the external device by using a message,
   and wherein a header of the message includes a mutex flag field and a mutex counter field.

3. The memory controller of claim 2,
   wherein the command queue includes a plurality of sub-command queues,
   and wherein the plurality of sub-command queues stores the commands with different priorities.

4. A storage device comprising:
   a memory device including a non-volatile memory configured to store data; and
   a memory controller configured to control the memory device to write or read the data to or from the memory device, receive a command from an external device, suspend performance of a control operation according to the command for a waiting time corresponding to a value of a mutex counter of the command when a mutex flag is activated, and perform the control operation according to the command when the mutex flag is deactivated.

5. The storage device of claim 4,
   wherein the memory controller communicates with the external device by using a message,
   and wherein a header of the message includes a mutex flag field and a mutex counter field.

6. A system comprising:
   a host; and
   a memory device including a non-volatile memory configured to store data; and a memory controller configured to control the memory device, to write or read the data to or from the memory device, receive a command from the host, suspend performance of a control operation according to the command for a waiting time corresponding to a value of a mutex counter of the command when a mutex flag is activated, and perform the control operation according to the command when the mutex flag is deactivated.

7. The system of claim 6, wherein the memory controller comprises:
a first interface configured to communicate with the host;
a second interface configured to communicate with the memory device;
a command queue configured to store commands received from the host; and
a processor configured to perform a control operation according to a command stored in the command queue, and suspend the performance of the control operation according to the command for a waiting time corresponding to a value of a mutex counter for the command, when a mutex flag for the command is activated.

8. The system of claim 6,
wherein the host and the memory controller communicate with each other by using a message,
and wherein a header of the message includes a mutex flag field and a mutex counter field.

9. The system of claim 8, wherein, during a watchdog timer test, the host sets the mutex flag field for a command to be activated, and sets the mutex counter field of the command to have a value that allows the waiting time of the memory controller until transmitting response to the command to be greater than a watchdog time corresponding to a set value of the watchdog timer.

10. The memory controller of claim 2,
wherein the message is defined based on an UFS Protocol Information Unit (UPIU) of a universal flash storage (UFS) standard.

11. The memory controller of claim 10,
wherein the mutex flag field and the mutex counter field are defined at a reserved field of the UPIU.

12. The storage device of claim 5,
wherein the message is defined based on an UFS Protocol Information Unit (UPIU) of a universal flash storage (UFS) standard.

13. The storage device of claim 12,
wherein the mutex flag field and the mutex counter field are defined at a reserved field of the UPIU.

14. The system of claim 8,
wherein the message is defined based on an UFS Protocol Information Unit (UPIU) of a universal flash storage (UPS) standard.

15. The system of claim 14,
wherein the mutex flag field and the mutex counter field are defined at a reserved field of the UPIU.

\* \* \* \* \*